(12) United States Patent
Stobbe

(10) Patent No.: US 7,522,052 B2
(45) Date of Patent: Apr. 21, 2009

(54) INSTALLATION AND METHOD FOR MONITORING THE TRANSFER OF GOODS THAT COMPRISE IDENTIFICATION CARRIERS

(75) Inventor: Anatoli Stobbe, Barsinghausen (DE)

(73) Assignee: ASTRA Gesellschaft für Asset Management mbH & Co. KG, Barsinghausen (DE)

( * ) Notice: Subject to any disclaimer, the term of this patent is extended or adjusted under 35 U.S.C. 154(b) by 154 days.

(21) Appl. No.: 11/472,213

(22) Filed: Jun. 21, 2006

(65) Prior Publication Data

US 2007/0013542 A1  Jan. 18, 2007

(30) Foreign Application Priority Data

Jun. 21, 2005 (DE) .................. 10 2005 029 003

(51) Int. Cl.
*G08B 13/14* (2006.01)
(52) U.S. Cl. ................. 340/572.1; 340/825.49
(58) Field of Classification Search .......... 340/572.1, 340/539.13, 825.49, 573.1, 10.1
See application file for complete search history.

(56) References Cited

U.S. PATENT DOCUMENTS

| 5,708,423 A | | 1/1998 | Ghaffari et al. |
| 5,745,036 A | * | 4/1998 | Clare ..................... 340/572.1 |
| 6,249,227 B1 | * | 6/2001 | Brady et al. ............ 340/572.1 |
| 6,600,418 B2 | * | 7/2003 | Francis et al. ........... 340/572.1 |
| 6,724,308 B2 | * | 4/2004 | Nicholson ............... 340/572.1 |
| 6,972,682 B2 | * | 12/2005 | Lareau et al. ........... 340/568.1 |
| 7,209,037 B2 | * | 4/2007 | Webb, Sr. .............. 340/539.13 |
| 7,295,114 B1 | * | 11/2007 | Drzaic et al. .......... 340/825.49 |
| 2005/0012612 A1 | | 1/2005 | Przygoda, Jr. |
| 2006/0220791 A1 | * | 10/2006 | Willins et al. ........... 340/10.3 |
| 2007/0188324 A1 | * | 8/2007 | Ballin et al. ............ 340/572.1 |

FOREIGN PATENT DOCUMENTS

| DE | 101 63 688 | 7/2003 |
| WO | WO 98/11520 | 3/1998 |
| WO | WO 98/38605 | 9/1998 |
| WO | WO 01/46923 A1 | 6/2001 |
| WO | WO 2004/029740 | 4/2004 |
| WO | WO 2004/034347 A1 | 4/2004 |

* cited by examiner

*Primary Examiner*—John A Tweel, Jr.
(74) *Attorney, Agent, or Firm*—Collard & Roe, P.C.

(57) ABSTRACT

Described are an installation and a method for monitoring the transfer of goods that comprise identification carriers, across a loading interface between a mobile transporter and a storage area, or between two mobile transporters. On the loading interface a reading device for contactless reading of the identification carriers and a location acquisition device are arranged and connected to an evaluation- and control device. During transfer of the goods across the loading interface, data of the identification carriers is read by means of a reading device, and location information of the goods is acquired by means of the location acquisition device, and the data is interlinked by means of the evaluation- and control device.

18 Claims, 3 Drawing Sheets

INSTALLATION AND METHOD FOR MONITORING THE TRANSFER OF GOODS THAT COMPRISE IDENTIFICATION CARRIERS

The invention relates to an installation for monitoring the transfer of goods that comprise identification carriers, according to the precharacterising part of claim 1, and to a method for monitoring the transfer of goods that comprise identification carriers, according to the precharacterising part of claim 15.

When transferring goods between a mobile transporter and a storage area or warehouse, monitoring of the transferred goods is carried out visually by staff using delivery notes or transfer lists, or with the support of identification carriers with which the goods have been provided.

However, such monitoring can be inadequate when tracing back complaints relating to the type, quantity or undamaged condition of the goods.

It is the object of the invention to improve an installation and a method for monitoring the transfer of goods that comprise identification carriers, to the extent that further characteristics of the goods are automatically registered. This object is met in an installation according to the precharacterising part of claim 1 by the features of this claim, and in a method according to the precharacterising part of claim 15 by the features of that claim.

Improvements and advantageous embodiments are shown in the respective subordinate claims.

According to the invention, on a loading interface a reading device for contactless reading of the identification carriers and an imaging device are arranged and connected to an evaluation- and control device. In the context of this invention the term "loading interface" refers to a region of a mobile transporter or of a storage area or intermediate region between a mobile transporter and a storage area, or between two mobile transporters and between two storage areas, such as intermediate storage areas, buffer storage areas, end product storage areas, production storage areas, sales storage areas, through which intermediate region the goods have to pass during transfer. The loading interface can for example be the goods loading opening of a lorry, a ramp, a conveyor device or a gateway to the storage area.

During transfer of the goods across the loading interface, data of the identification carriers affixed to the goods is read by means of a reading device, and location information is acquired by means of a location acquisition device, and furthermore, the data is linked to the location information by means of an evaluation- and control device.

The identification carriers can be information carriers that indicate a pallet containing goods, that indicate the outer packaging, or that indicate the individual goods themselves.

Linking data of the identification carriers with location information of the goods and thus also of the mobile transporters, as well as identification data of the gateway or of the reading devices, results in supplementary documentation of the goods transfer, which documentation facilitates tracing back complaints. This can be helpful in investigating mistakes, malfunctions or irregularities.

In addition, images of the goods themselves can be acquired by means of an imaging device, and the data of the identification carriers and location information can be linked by the evaluation- and control device.

This leads to comprehensive documentation of the goods transfer and of loading- and unloading procedures. If applicable, any faulty or inaccurately acquired data can be reconstructed from the wealth of other data.

According to an improvement the imaging device can be triggered by the reading device or by a movement detection device that is connected to the evaluation- and control device.

In this way imaging is limited to the period in time during which a reading process of the identification carrier takes place or during which movement of the goods is acquired. In this way images can be taken with the goods in uniform positions and with the same settings of the imaging device as far as distance and imaging angle are concerned. Furthermore, triggering by the reading device makes it possible to obtain unequivocal time-related allocation of identification data and images. With triggering by the movement detection device it is also possible to register goods that have no identification carrier or that have a non-legible identification carrier, when such goods pass through the loading interface.

Furthermore, the imaging device and the reading device can also be triggered by a movement detection device that is connected to the evaluation- and control device.

In the case of a large acquisition region of the reading device, in this way moved goods can be selected from goods that have not been moved. Moreover, goods can be identified that have no identification carrier or that have a non-legible identification carrier, when such goods pass through the loading interface.

The movement detection device can comprise a dual light barrier or a radar sensor.

In this way it is possible to determine any movement of goods within a specified limited region with great accuracy, and to determine the direction of movement.

Preferably, the reading device comprises four reading antennas, arranged laterally on the loading interface, each of which antennas has its own reading unit or is connected to a shared reading unit by way of an antenna multiplexer.

With such an arrangement of the reading antennas a sufficiently small reading distance to information carriers is maintained, irrespective of the alignment of the information carriers on the goods when said goods pass through the loading interface.

The imaging device can comprise at least one camera that is directed towards the loading interface.

In this way images are taken only of goods that pass through the loading interface. These goods can be acquired in a format-filling manner so that details can be optimally depicted in line with the available resolution of the camera. It is possible to take individual images, a series of individual images or moving sequences.

The imaging device can also comprise further cameras that are directed towards identification characteristics of the mobile transporter and/or of the storage area.

The further identification characteristics improve monitoring of the goods transfer and can help clarify mistakes, malfunctions or irregularities. In the case of a stationary installation on the loading interface of the storage area it is, for example, possible to take images of the mobile transporter, namely the lorry, of any signage on said lorry, or of its registration number plate. In the case of a mobile installation on the mobile transporter it is, for example, possible to take images of the surroundings, of the warehouse or of company signage.

The evaluation- and control device can be connected to a date- and time register, and by means of the evaluation- and control device details concerning date and time can be linked with data of the identification carriers, with location information and with images of the goods.

Any linkage with details relating to date and time also improves monitoring of the goods transfer and can be helpful in investigating mistakes, malfunctions or irregularities.

Preferably, the evaluation- and control device is connected, by way of a data interface, to a network, by way of which network data relating to the identification carriers and images of the goods can be transferred to a central station.

In this way real-time transmission, which is largely secure against tampering, to the central station, of all relevant connected data becomes possible. The transmitted data can be compared with information on orders and lists, and furthermore, if any errors or irregularities occur, it is possible to immediately take remedial action, or cause such remedial action to be taken.

Moreover, by way of the network, loading data or authorisation data can be transmitted from the central station to the evaluation- and control device. By means of such loading- or authorisation data it is possible, even after initial determination of logistics orders, to issue new orders even while on a delivery run, or to change or cancel orders that have not been carried out yet, and to convey such orders to the personnel involved.

Furthermore, a signal device can be connected to the evaluation- and control device, wherein said signal device can be controllable, by the evaluation- and control device, depending on the data of the identification carriers, either exclusively or depending on the data of the identification carriers in connection with stored transfer data and/or by way of transfer data transmitted by way of the network.

The signal device can specify to personnel the goods that need to be transferred, or said signal device can merely indicate, when the goods pass through the loading interface, whether the transfer that is in progress is correct or incorrect.

In addition, the signal device can be controllable depending on information relating to date and time, and/or depending on location information.

By means of this information it is also possible to determine and display the goods that at the actual location at the actual time are to be transferred. To keep it more simple it is also possible to indicate whether the transfer that is in progress is correct or incorrect at the actual location and at the actual time.

Below, the invention is described with reference to exemplary embodiments that are shown in the drawing, as follows.

Figure 1:
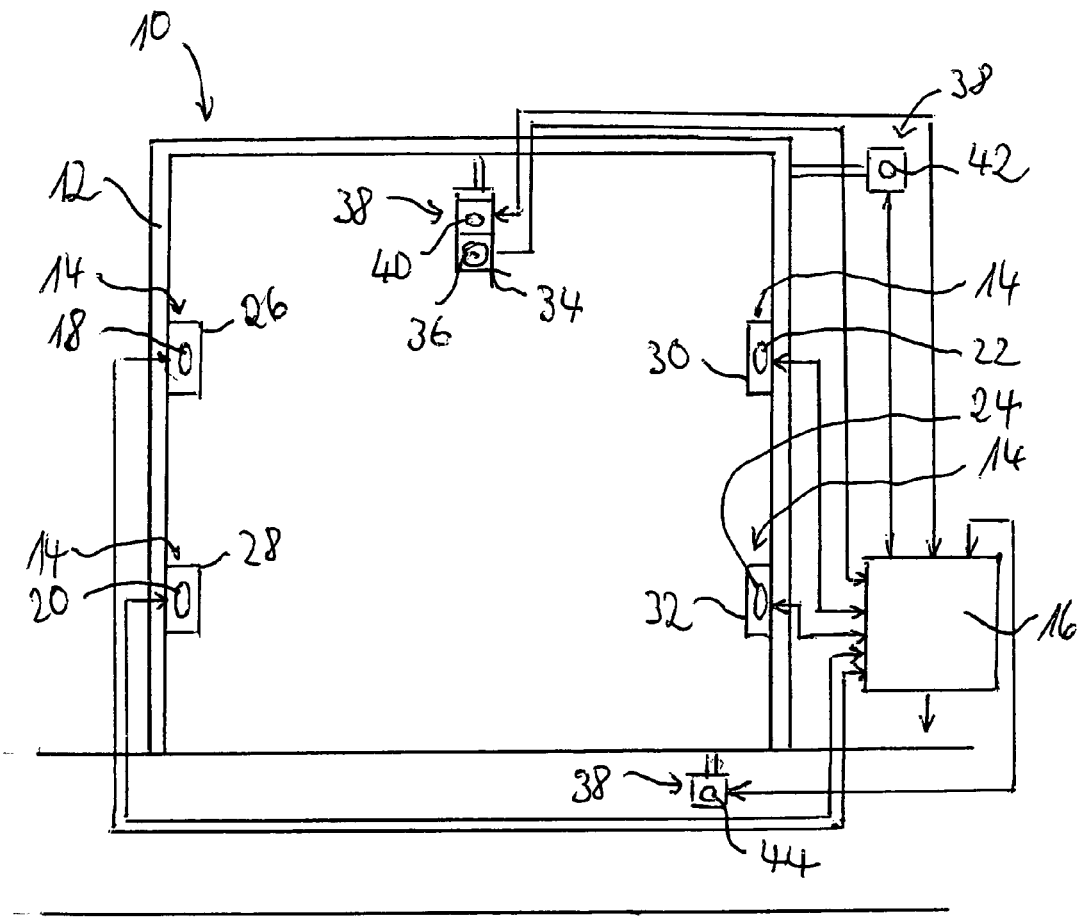
FIG. 1 shows a stationary loading interface with a reading device, an imaging device, a movement detection device, and an evaluation- and control device.

The stationary loading interface 10 is formed by a gateway 12 to a stationary storage area. The gateway 12 comprises a reading device 14 that is connected to an evaluation- and control device 16. The reading device 14 comprises reading antennas 18, 20, 22, 24 with reading units 26, 28, 30, 32, each arranged at different heights on both sides of the gateway 12.

On the upper transverse limb of the gateway 12 a movement detection device 34 is arranged and also connected to the evaluation- and control device 16. The movement detection device 34 comprises a radar sensor 36, which registers the movement of objects and their direction in the reading region of the reading antennas 18, 20, 22, 24.

Furthermore, an imaging device 38 is associated with the gateway 12, which imaging device 38 is also connected to the evaluation- and control device 16 and comprises three cameras 40, 42, 44. A first camera 40 points towards the gateway 12 in order to take images of goods that are transferred through the gateway. A second camera 42 points towards the outside in order to take images of characteristics of the mobile transporter and its surroundings. A third camera 44 is directed to the registration number plate of the mobile transporter.

Figure 2:
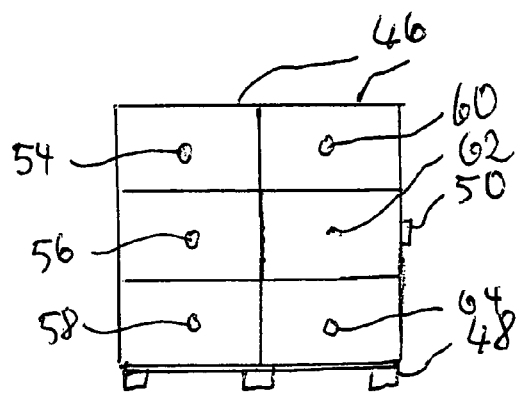
FIG. 2 shows goods with identification carriers, on a pallet.

FIG. 2 shows goods 46 with identification carriers 54, 56, 58, 60, 62, 64 on a pallet 48. On an outer longitudinal side or transverse side an identification carrier 50 is arranged for characterising the pallet 48. This ensures that, irrespective of the alignment of the pallet 48, the identification carrier 50 during the transfer of a pallet 48 through the gateway 12 is particularly close to one of the reading antennas 18, 20, 22, 24 and can thus reliably be read.

Further identification carriers can be associated with the outer packaging that comprises several units of goods. Finally, further identification carriers can also be associated with the individual goods. Depending on the type of the transfer mode of the identification carriers and on the reading distance, these identification carriers can also be read during the transfer of a pallet through the gateway.

Figure 3:
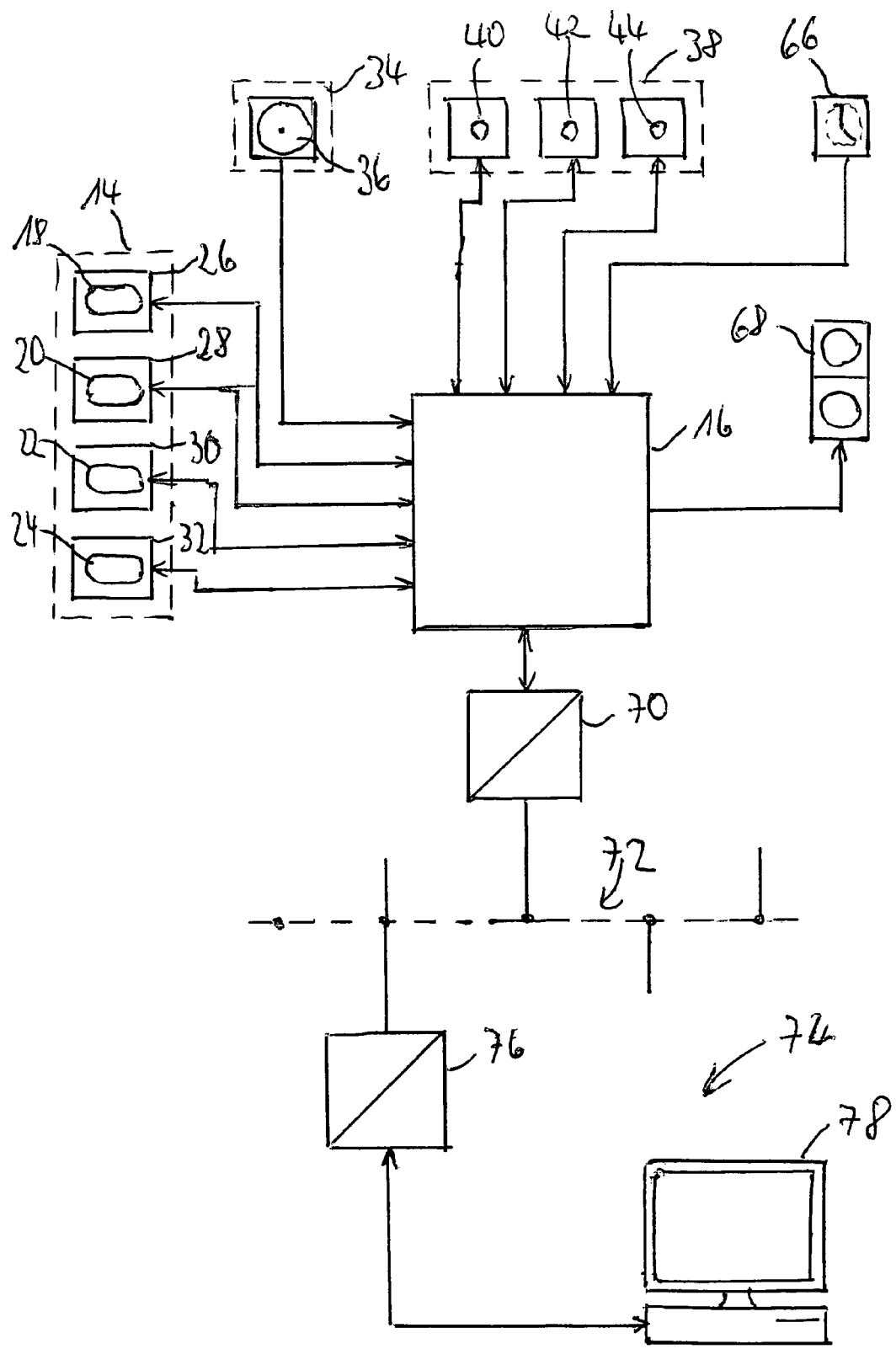
FIG. 3 shows a block diagram of a stationary installation comprising a network and a central station.

FIG. 3 shows a block diagram of a stationary installation comprising a network 72 and a central station 74. The stationary installation comprises the components already mentioned in FIG. 1, namely the evaluation- and control device 16, the reading device 14 with the reading antennas 18, 20, 22, 24 and reading units 26, 28, 30, 32, the movement detection device 34 with the radar sensor 36, and the imaging device 38 with the three cameras 40, 42, 44.

Furthermore, a date- and time register 66, a signal device 68 and a data interface 70 are connected to the evaluation- and control device 16. By way of the data interface 70 and a connected network 72, e.g. the internet, the evaluation- and control device 16 can exchange data with a central station 74. In this arrangement the central station 74 also comprises a data interface 76 and at least one computer 78.

Several operating modes are possible for operation of the stationary installation. These operating modes can be implemented by a control program.

a) If goods comprising an identification carrier 50 are transferred through the gateway 12, data of the identification carrier 50 is read by means of the reading device 14 and is transferred to the evaluation- and control device 16. Subsequently the evaluation- and control device 16 triggers the imaging device 38. The images taken by one or several cameras 40, 42, 44 are transmitted to the evaluation- and control device 16 as image data and are linked with the data of the read identification carrier 50, e.g. to form a data record. The images and data are stored in a memory of the evaluation- and control device 16 and/or are transmitted to the central station 74.

b) If goods are transferred through the gateway 12, their movement and direction of movement are detected by the movement detection device 34 and transmitted to the evaluation- and control device 16. The evaluation- and control device 16 then triggers the reading device 14 and the imaging device 38. The images taken by one or several cameras 40, 42, 44 are transmitted to the evaluation- and control device 16 as image data and are linked with the direction of movement. If the goods comprise a legible identification carrier 50, the data of the read identification carrier 50 is also linked to the image data and direction data. This data is stored in a memory of the evaluation- and control device 16 and/or is transmitted to the central station 74.

In this operating mode it is also possible to identify goods without identification carriers or with identification carriers that are illegible. In this case, instead of linking the data record with one or several instances of data from identification carriers, the data record is linked to data that comprises an error code. The error code can for example comprise information such as "no identification data exists", "illegible" or "not known to the system".

c) As a supplement to a and b, the data supplied by a date- and time register 66 can be linked with the image data, direction data and data of the identification carriers or error codes.

d) As a supplement to a, b, or c, the read data of the identification carrier 50 can also be compared with stored reference data or reference data transmitted from the central station 74 to the evaluation- and control device 16; wherein the result of the comparison with further data, namely image data, direction data, data from the identification carriers or error codes and date and time is linked and then stored and/or transmitted to the central station 74 and/or used to generate control signals of the evaluation- and control device 16.

In the above comparison, additionally, information relating to date and time can be taken into account as a further reference. By means of the control signals the signal device 68 can be controlled. In this arrangement it is possible to indicate the goods that at the actual location at the actual time are to be transferred, or, more simply, it is possible to indicate, e.g. as a red/green traffic light, whether the transfer that is in progress is correct or incorrect at the actual location and at the actual time.

e) If the data records are transmitted to a central station 74, the data can additionally comprise an identification number of the gateway 12 or of reading units 26, 28, 30, 32 so as to make it possible to allocate the location and the operation in cases where there are several installations.

Figure 4:
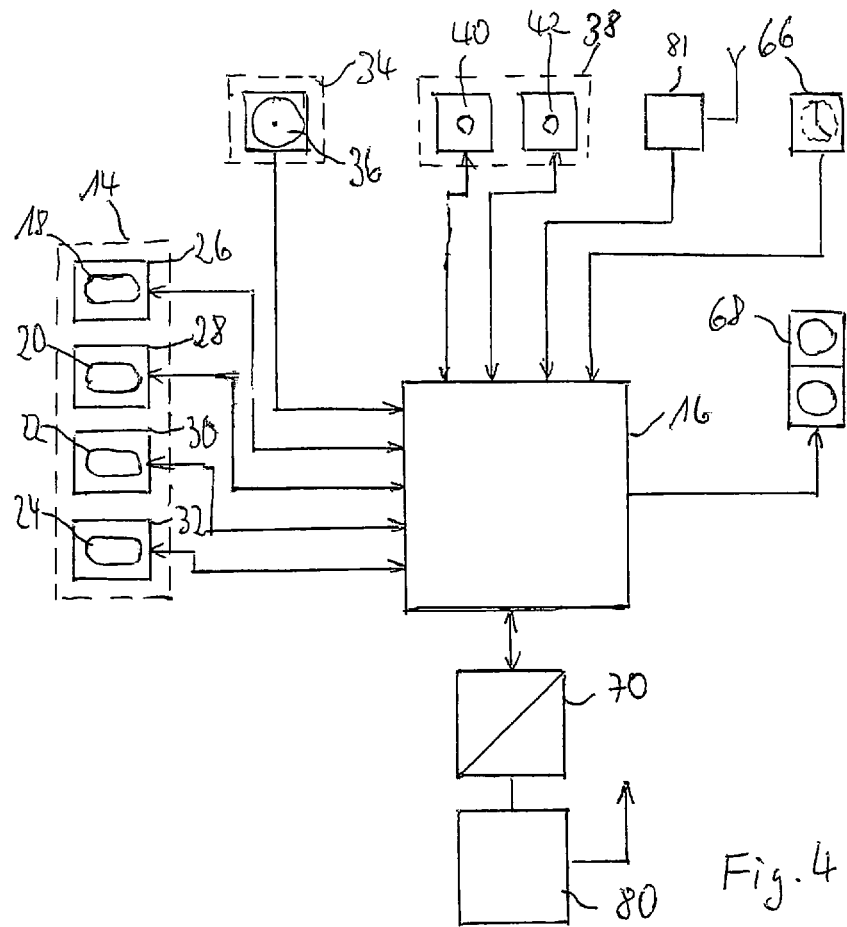
FIG. 4 shows a block diagram of a stationary installation.

FIG. 4 shows a block diagram of a mobile installation. In this arrangement the loading interface is formed by the frame of the loading opening. As is the case in FIG. 3, said frame also comprises the evaluation- and control device 16, the reading device 14 with the reading antennas 18, 20, 22, 24 and reading units 26, 28, 30, 32, the movement detection device 34 with the radar sensor 34, and the imaging device 38 in this case with two cameras 40, 42, the date- and time register 66, the signal device 68 and the data interface 70. The second camera 42 is directed towards the storage area. The data interface 70 is designed for a mobile radio network such as GSM, GPRS or UMTS and is connected to a mobile radio device 80.

In addition, a location acquisition device 81 e.g. a GPS device, is connected to the evaluation- and control device 16.

For operation of the mobile installation the operating modes a to d are possible in the same way as with the stationary installation. In addition to, or instead of, the operating mode e, the location information can also be linked, in text or as a geographic coordinate, to the other data. Furthermore, location information can also be stored in the evaluation- and control device 16 as reference data, or it can be transmitted from the central station 74 by way of the network 72 to the evaluation- and control device 16. During the comparison the actual location data can be compared with the reference data by itself, or together with other reference data, and the result of the comparison can be utilised analogously to the stationary variant.

Figure 5:
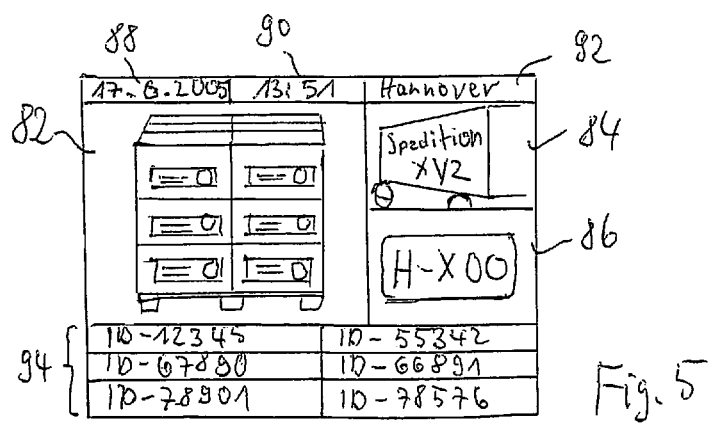
FIG. 5 shows a view of the data to be displayed at the central station.

FIG. 5 shows a view of the data transmitted to the central station 74. In this arrangement linking of data also applies to the visual display. The view of a transfer procedure comprises several sectors for displaying alphanumeric data and image data. Thus, sector 82 displays an image of the transferred goods, sector 84 displays an image of a lorry with its signage, and sector 86 displays an image of the registration number plate of the lorry. A further sector 88 contains the date, while a sector 90 contains the time at which the transfer took place.

An additional sector 92 contains the location or an identification number of the gateway 12 or of the reading units 26, 28, 30, 32. Finally, a sector 94 has been provided for identification numbers that are read as data contained on the identification carriers of the pallet, on the outer packaging or on the individual goods.

The invention claimed is:

1. An installation for monitoring the transfer of goods that comprise identification carriers (50), said installation comprising a loading interface (10) between a mobile transporter and a storage area, or between two mobile transporters, a reading device (14) for contactless reading of the identification carriers (50), a location acquisition device (81), an image-recording device (38), a signalling device (68), and an evaluation- and control device (16), the reader device (14), the location acquisition device (81), the image-recording device (3), and the signalling device (68) being connected with the evaluation- and control device (16), and, during transfer of the goods across the mobile loading interface (10), data of the identification carriers (50) can be read by means of the reading device (14), location data of the goods can be acquired by means of the location acquisition device (81), and image data including at least one image of the goods can be recorded by means of the image-recording device (38), and the data can be interlinked by means of the evaluation- and control device (16), and the signalling device (68) can be controlled by the evaluation and control device (16), wherein the location acquisition device is a global positioning device (81), the image-recording device (38) and the reader device (14) can be triggered by means of a movement detection device (34) that is connected with the evaluation- and control device (16), and can detect both a movement and a movement direction, and the detected movement direction, together with the data of the identification carriers, the location data detected by the global positioning device, and the at least one image of the goods, can be linked by means of the evaluation- and control device (16), and compared with reference data, and the signalling device (68) can be controlled as a function of the comparison.

2. The installation according to claim 1, wherein the movement detection device (34) comprises a dual light barrier or a radar sensor (36).

3. The installation according to claim 1, wherein the reading device (14) comprises four reading antennas (18, 20, 22, 24), arranged laterally on the loading interface, each of which antennas (18, 20, 22, 24) has its own reading unit (26, 28, 30, 32) or is connected to a shared reading unit by way of an antenna multiplexer.

4. The installation according to claim 1, wherein the imaging device (38) comprises at least one camera (40) that is directed towards the loading interface (10).

5. The installation according to claim 4, wherein the imaging device (38) comprises further cameras (42) that are directed towards the mobile transporter and/or the storage area.

6. The installation according to claim 4, wherein the imaging device (38) comprises further cameras (44) that are directed towards identification characteristics of the mobile transporter and/or of the storage area.

7. The installation according to claim 1, wherein the evaluation- and control device (16) is connected to a date- and time register (66), and by means of the evaluation- and control device (16) details concerning date and time can be linked with data of the identification carriers (50), with location information and with images of the goods.

8. The installation according to claim 1, wherein the evaluation- and control device (16) is connected, by way of a data interface (70), to a network (72), by way of which network (72) data relating to the identification carriers (50) and images of the goods can be transferred to a central station (74).

9. The installation according to claim 1, wherein by way of a data interface (76) the evaluation- and control device (16) is connected to a network (72), and wherein authorization data can be transmitted from the central station (74) to the evaluation- and control device (16).

10. The installation according to claim 1, wherein the signal device (68) is controllable by the evaluation- and control device (16) depending on the data of the identification carriers (50), either exclusively or depending on the data of the identification carriers (50) in connection with stored transfer data and/or by way of transfer data transmitted by way of the network (72).

11. A method for monitoring the transfer of goods that comprise identification carriers across a loading interface (10) between a mobile transporter and a storage area, or between two mobile transporters, wherein during the transfer of the goods across the loading interface (10), data of the identification carriers (50) is read by means of a reading device (14) for contactless reading of the identification carriers (50), location data of the goods is acquired by means of a location acquisition device (81), and at least one image of the goods is acquired by means of an image-recording device (38), and the data of the identification carriers (50), the location data, and the at least one image are linked with one another by means of an evaluation- and control device (16), and a signalling device (68) is turned on, wherein the image-recording device (38) and the reading device (14) are triggered by means of a movement detection device (34) that is connected with the evaluation- and control device (16), and detects both a movement and a movement direction, and the detected movement direction, together with the data of the identification carriers (50), the location data detected by way of a global positioning device, and the at least one image of the goods, are linked by means of the evaluation- and control device, and compared with reference data, and a signal is generated by the signalling device (68), as a function of the comparison.

12. The method according to claim 11, wherein, in addition, images of the mobile transporter and/or of the storage area are taken and linked with data of the identification carriers (50).

13. The method according to claim 11, wherein, in addition, images of identification characteristics of the mobile transporter and/or of the storage area are taken and linked with data of the identification carriers (50).

14. The method according to claim 11, wherein the data of the identification carriers (50), the location information and the image data are linked with information relating to date and time.

15. The method according to claim 11, wherein by way of a data interface (70) and a network (72) the linked data is transmitted to a central station (74).

16. The method according to claim 11, wherein by way of a network (72) authorization data is transmitted from the central station (74) to the evaluation- and control device (16).

17. The method according to claim 11, wherein the signal device (68) is controllable, depending on the data of the identification device (50), either exclusively or depending on the data of the identification carriers (50) in connection with stored transfer data and/or by way of transfer data transmitted by way of the network (72).

18. The method according to claim 17, wherein, in addition, the signal device (68) is controlled depending on information relating to date and time.

* * * * *